Dec. 27, 1949  V. E. SCOTTI  2,492,326
DOUCHE SYRINGE AND CONTAINER ASSEMBLY
Filed Nov. 21, 1946  2 Sheets-Sheet 1

Inventor
Vesta E. Scotti
By Christy, Parmelee & Strickland
Attorneys

Dec. 27, 1949 V. E. SCOTTI 2,492,326
DOUCHE SYRINGE AND CONTAINER ASSEMBLY
Filed Nov. 21, 1946 2 Sheets-Sheet 2

Inventor
Vesta E. Scotti
By Christy, Parmelee & Strickland
Attorneys

Patented Dec. 27, 1949

2,492,326

UNITED STATES PATENT OFFICE 2,492,326

DOUCHE SYRINGE AND CONTAINER ASSEMBLY

Vesta E. Scotti, Pittsburgh, Pa.

Application November 21, 1946, Serial No. 711,342

2 Claims. (Cl. 206—63.2)

The present invention relates to a syringe and container assembly, more particularly, a douche syringe which is mounted in a container in the manner so that its nozzle will remain out of contact with the inner walls of the container and wherein the container itself is useful for mixing the liquid solution for the douche.

In the past, douche syringes have been eyesores in storage cabinets in bathrooms and the like since they are generally not enclosed in containers. Moreover, makeshift receptacles, which are generally unhandy when required, are often used for mixing the douche solution, which receptacles are oftentimes unsuitable for the purpose.

An object of the present invention is to overcome the above-mentioned difficulties by providing a douche syringe and container assembly which is such as to properly mount the douche syringe with its nozzle suspended downwardly and out of contact with the inner walls and protruding into a container having suitable calibrations to make it suitable for mixing a douche solution therein, therefore having a dual purpose.

A more specific object of this invention is to provide a douche syringe having a rubber-like bulb portion provided with an integral annular flange portion which is adapted to be sandwiched between a container and its lid and clamped by virtue of a screw threaded arrangement between the container and lid so as to provide a liquidtight and airtight seal for maintaining the nozzle of the douche syringe in sterile condition.

A further object of this invention is to provide a container having a lid portion and having a ring-like supporting means for the nozzle portion of a douche syringe for suspending the douche syringe inside the container in a manner so that its nozzle will be out of contact with the inner walls.

Other objects and advantages of the present invention will become apparent from a study of the following specification taken with the accompanying drawings wherein.

Figure 1:
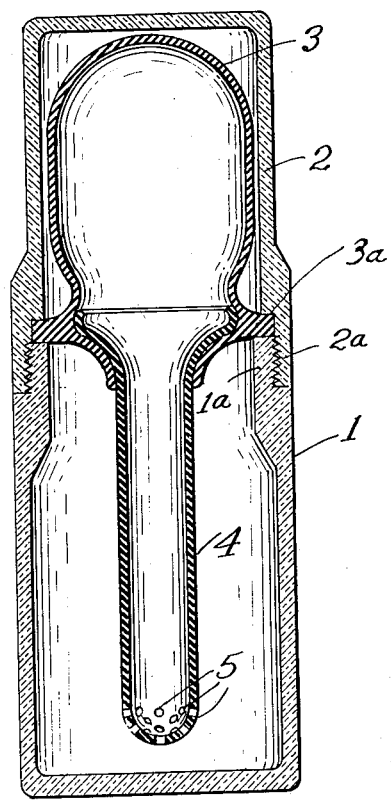
Fig. 1 is a longitudinal cross sectional view of a douche syringe and container assembly embodying the principles of the present invention.

Referring more particularly to Fig. 1, numeral 1 denotes a substantially cup-shaped container which may be made of any suitable material, preferably opaque material, such as metal, plastic, enamelware, or the like, which container has a lid 2, preferably made of the same material and in telescoping relationship with container 1. That is, the mouth portions 1a and 2a of the container and lid, respectively, are narrowed in cross section and are screw threaded together.

Enclosed within the container is a douche syringe comprising a rubber-like bulb 3 of collapsible material, such as rubber or the like, and a nozzle 4 having suitable holes 5 for the injection of liquid therefrom. The bulb 3 has a radially outwardly extending integral flange portion 3a which is adapted to rest on the top edge of mouth 1a of the container so as to be sandwiched between the shoulder portion of the lid and the container. Thus it will be seen by screwing the lid 2 onto the container 1, the annular flange 3a becomes tightly clamped or compressed so as to form not only an airtight but a liquidtight seal between the lid and container. Thus the container and lid serve not only to seal the douche syringe, but to support it so that the nozzle of the douche syringe is suspended out of contact with the inner walls of the container. Moreover, the container 1 may have suitable graduations disposed on the inner (or outer) walls thereof so that any suitable douche solution may be accurately mixed in the container. A preferable size for container 1 is of the order of one quart, although it will be understood that it may be of larger or smaller size, if desired. The douche syringe is therefore kept in a sterile condition and is supported so as to be in readiness for use when desired. In some instances, it may be desired to keep the liquid solution within the container when in storage so as to make it possible to take a douche instantly, without the necessity of delay for the preparation of the liquid solution.

Figure 2:
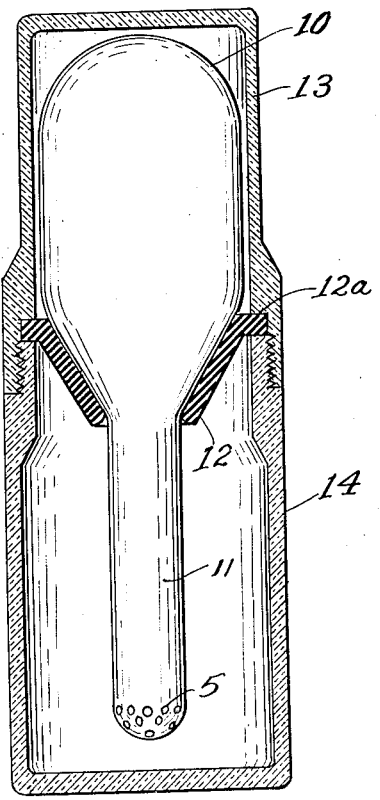
Fig. 2 is a longitudinal cross sectional view of a modification of the structure shown in Fig. 1.
Figure 3:
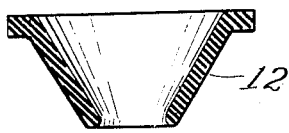
Fig. 3 is a cross sectional view of the frustoconical element 12 shown in Fig. 2.

Fig. 2 shows a modification of the assembly shown in Fig. 1 wherein a more standard type of douche syringe is provided having a bulb 10 and a nozzle 11, but which bulb has no integral annular flange. A frustoconical element 12 made of rubber, plastic, or other suitable material and having flanged radially outward extending portion 12a is provided for supporting the douche syringe with respect to the container. That is, the flange portion 12a is sandwiched between the lid 13 and container 14 so that it may be effectively clamped to provide a liquidtight and airtight seal. The advantage of using an additional element, such as 12, is that it is adaptable for use for supporting standard shapes of douche syringes.

Figure 4:
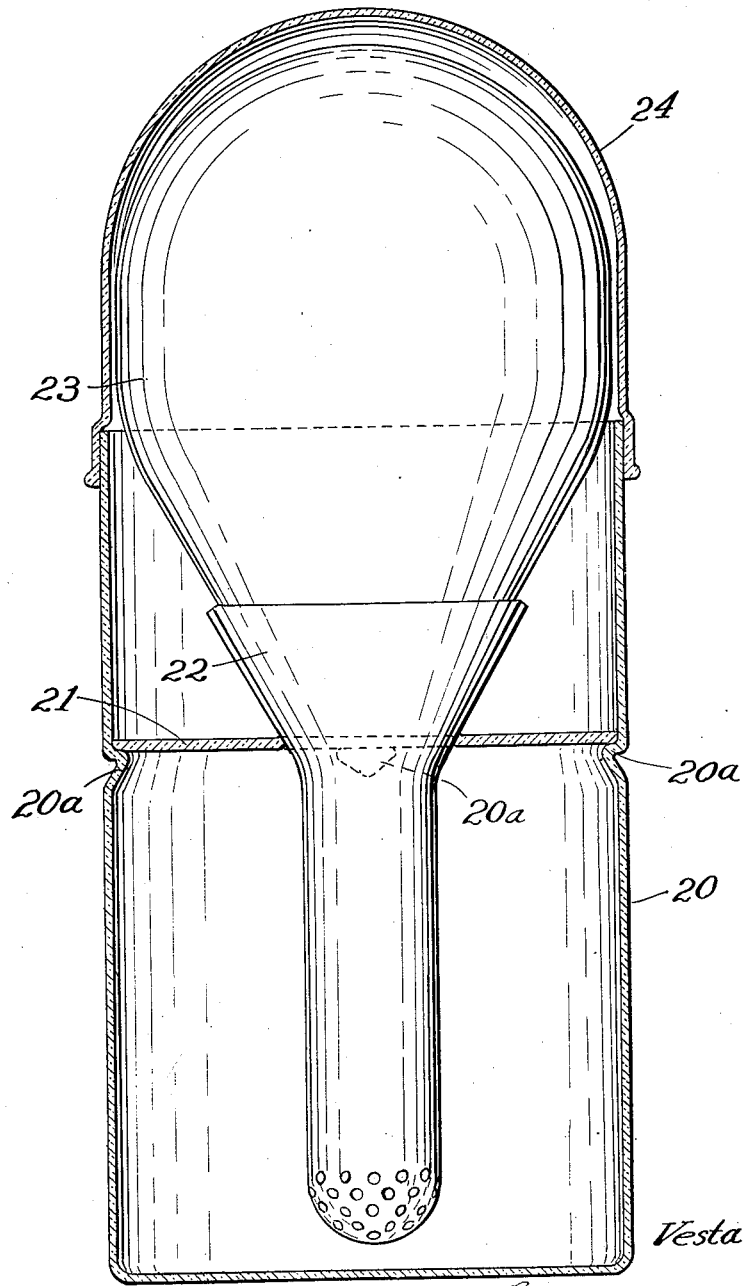
Fig. 4 is a longitudinal cross sectional view of a still further modification of the assembly shown in Fig. 1.

Fig. 4 shows a still further modification wherein the container 20 is provided along a peripheral portion thereof with a plurality of radially inwardly extending protuberances or projections 20a to provide shoulders or supports for supporting a ring 21 which may be slipped into the container. Ring 21 has a hole centrally thereof through which projects the nozzle 22 of a standard douche syringe. The douche syringe also includes a bulb 23. A lid 24 is telescopically fitted about the mouth of the container 20 so as to provide a sliding friction type fit. It will be understood, of course, that the connection between the lid and container may be screw threaded, if desired, or of any other suitable configuration. The ring 21 may be made of metal, plastic, or any other suitable material. Its advantage is again, as in Fig. 2, that it can be applied to standard shapes of douche syringes.

While the above described assembly is described and illustrated as a douche syringe, it will be apparent that other types of syringes may be likewise supported, such as injection syringes and the like.

Thus it will be seen that I have provided an efficient container and assembly for a douche syringe which not only hides the syringe from view, but supports the nozzle thereof out of contacting relation with the inner walls of a container and provides an airtight and liquidtight seal so as to keep the nozzle sterile at all times, and which container may be calibrated so as to make it readily adaptable for mixing the douche solution,—furthermore, I have provided an assembly wherein an integral part of the douche rubber-like bulb can be tightly clamped between the lid and container so as to provide an effective liquidtight seal and which may be particularly useful in instances when the liquid, as well as the douche syringe, is stored in the container for immediate use at any time.

While I have illustrated and described certain specific embodiments of my invention, it will be understood that this is by way of illustration only and that various changes and modifications may be made within the contemplation of my invention and within the scope of the following claims.

I claim:

1. An assembly comprising a container having a cup-like portion and a lid portion in combination with a douche syringe having a bulb portion and a nozzle portion, the latter projecting into the cup-like portion and a truncated conical element having an annular flange which is sandwiched between said cup-like portion and said lid and whose portion of reduced diameter supports the portion of the bulb adjacent said nozzle, thereby supporting the nozzle in spaced relationship from the inner walls of the cup-like portion.

2. An assembly comprising a container having a cup-like portion and a lid portion in combination with a douche syringe having a bulb portion and a nozzle portion, the latter projecting into the cup-like portion and a truncated conical element having an annular flange which is sandwiched between said cup-like portion and said lid and whose portion of reduced diameter supports the portion of the bulb adjacent said nozzle, thereby supporting the nozzle in spaced relationship from the inner walls of the cup-like portion, said frustoconical element being made of rubber-like material and said cup-like portion and lid having screw threaded telescoping parts for tightly clamping said annular flange between said lid and cup-like portions.

VESTA E. SCOTTI.

REFERENCES CITED

The following references are of record in the file of this patent:

UNITED STATES PATENTS

| Number | Name | Date |
| --- | --- | --- |
| 1,581,341 | Guinness | Apr. 20, 1926 |
| 1,711,594 | Gillespie | May 7, 1929 |
| 1,941,441 | Miller | Dec. 26, 1933 |
| 2,058,516 | Schaaf | Oct. 27, 1936 |